(12) United States Patent
Hu et al.

(10) Patent No.: US 12,045,263 B2
(45) Date of Patent: Jul. 23, 2024

(54) AUTONOMOUS MINING METHOD OF INDUSTRIAL BIG DATA BASED ON MODEL SETS

(71) Applicant: Guangdong University of Petrochemical Technology, Maoming (CN)

(72) Inventors: Shaolin Hu, Maoming (CN); Qiliang Guo, Maoming (CN); Qinghua Zhang, Maoming (CN); Guo Xie, Maoming (CN); Chenglin Wen, Maoming (CN); Wenzhuo Chen, Maoming (CN); Gaowei Lei, Maoming (CN); Ye Ke, Maoming (CN)

(73) Assignee: Guangdong University of Petrochemical Technology, Maoming (CN)

( * ) Notice: Subject to any disclaimer, the term of this patent is extended or adjusted under 35 U.S.C. 154(b) by 0 days.

(21) Appl. No.: 17/955,749

(22) Filed: Oct. 13, 2022

(65) Prior Publication Data

US 2023/0297597 A1 Sep. 21, 2023

(30) Foreign Application Priority Data

Sep. 30, 2021 (CN) .......................... 202111168737.0

(51) Int. Cl.
*G06F 16/28* (2019.01)
*G06F 16/22* (2019.01)
*G06F 16/2458* (2019.01)

(52) U.S. Cl.
CPC .......... *G06F 16/285* (2019.01); *G06F 16/221* (2019.01); *G06F 16/2462* (2019.01); *G06F 16/2465* (2019.01)

(58) Field of Classification Search
CPC ............... G06F 16/285; G06F 16/2465; G06F 16/2462; G06F 16/26; G06F 16/2474;
(Continued)

(56) References Cited

U.S. PATENT DOCUMENTS 10,649,424 B2\* 5/2020 Nixon ..................... G05B 17/02
11,281,969 B1\* 3/2022 Rangapuram ............ G06N 7/01
(Continued)

FOREIGN PATENT DOCUMENTS

| CN | 102945240 A | 2/2013 |
| CN | 107679300 A | 2/2018 |
| CN | 109033497 A | 12/2018 |

OTHER PUBLICATIONS

Gao, "Homogeneous Vulnerability Mining Simulation of Online Network Heterogeneous Fault Tolerant Data" 1006-9348 (Mar. 15, 2020) 03-0377-04 Computer Simulation.
(Continued)

*Primary Examiner* — Evan Aspinwall
(74) *Attorney, Agent, or Firm* — Stuart H. Mayer; Kaplan Breyer Schwarz LLP

(57) ABSTRACT

Disclosed is an autonomous mining method of industrial big data based on model sets, which comprises the following steps: S1, building model sets and a mining engine based on domain knowledge and structural characteristics of multi-source heterogeneous data; S2, carrying out data sampling on the multi-source heterogeneous data, and counting the fault-tolerant estimation of random error variance; S3, mining data sets by using the mining engine, and determining the optimal fault-tolerant model of each sampled data sequence and the optimal fault-tolerant estimation of model parameters; S4, performing goodness-of-fit statistics calculation and VV&A test by using the optimal fault-tolerant model; S5, acquiring data model representation and connotation knowledge based on model clustering. The method
(Continued)

can realize the automation of the mining process of big data, the integration of associated knowledge, the expansion of model sets, the integration of mining and modeling and the optimization of mining results.

5 Claims, 4 Drawing Sheets

(58) Field of Classification Search
CPC ........ G06F 17/18; G16Y 30/00; G16Y 40/10; G06Q 10/06315; G05B 19/4188; G05B 19/41865
USPC .......................................................... 707/737
See application file for complete search history.

(56) References Cited

U.S. PATENT DOCUMENTS

| | | | |
|---|---|---|---|
| 2017/0032281 A1* | 2/2017 | Hsu | G05B 19/41875 |
| 2017/0102693 A1* | 4/2017 | Kidd | G05B 19/41865 |
| 2017/0102694 A1* | 4/2017 | Enver | G06Q 10/063 |
| 2018/0300191 A1* | 10/2018 | Bengea | G06F 11/07 |
| 2019/0114554 A1* | 4/2019 | Chen | G06N 20/10 |
| 2019/0188737 A1* | 6/2019 | Asenjo | H04L 67/1097 |
| 2022/0327032 A1* | 10/2022 | Chang | G06F 11/1451 |

OTHER PUBLICATIONS

Shiqiang, et al. "Summary of data mining technology and its engineering application" published Aug. 20, 2008, Computer and Information Technology.

\* cited by examiner

AUTONOMOUS MINING METHOD OF INDUSTRIAL BIG DATA BASED ON MODEL SETS

CROSS-REFERENCE TO RELATED APPLICATIONS

This application claims priority to Chinese Patent Application No. 202111168737.0, filed on Sep. 30, 2021, the contents of which are hereby incorporated by reference.

TECHNICAL FIELD

The application relates to the technical field of artificial intelligence and industrial automation, and in particular to an autonomous mining method of industrial big data based on model sets.

BACKGROUND

Data mining is a hot issue in the field of intelligent computing and data management. The industrial data mining refers to a nontrivial process that reveals hidden, previously unknown and potentially valuable information from a large amount of sampled data in the industrial production process.

Data mining is a decision-making supporting process, which is mainly based on artificial intelligence, machine learning, pattern recognition, statistics, database, visualization technology, etc., and is to analyze the data of enterprises with high automation, make inductive reasoning, mine potential patterns, and help decision-makers adjust market strategies, reduce risks and make correct decisions. At present, there are a lot of data mining algorithms, including neural network, decision tree, genetic algorithm, rough set, fuzzy set and association rules, etc. Data mining is divided into supervised data mining and unsupervised data mining.

Supervised data mining, such as classification, evaluation, prediction and other typical supervised data mining methods, essentially refers to the use of existing data to build models, use models to describe specific attributes, and extract the inherent knowledge of data from the dataset.

Unsupervised data mining is a kind of mining method with many kinds of technologies. For example, the association rule mining and the K-means clustering belong to unsupervised data mining, and unsupervised mining can usually be used to find the relationship as well as knowledge in all attributes Among the existing typical mining technologies, some widely used mining approaches, whether they are the supervised data mining or the unsupervised data mining, have three limitations from the perspective of industrial application, which is not conducive to the application of big data:

(1) for the existing supervised mining technology, its basic idea is to use one model at a time to extract knowledge from the dataset, which belongs to the passive use of models and is difficult to achieve automatic comparison and optimization of multiple models;

(2) taking the Clementine software, which is widely used in the field of data mining internationally, as an example, this software is a supervised model-based data mining tool. In the mining process, manual intervention is required to select model forms and data files. As for the mining process, the workload and procedures are complicated, which is not conducive to automatic mining of large quantities of data;

(3) as for unsupervised data mining, it is essentially a kind of "blind mining", which can neither guarantee the mining results, nor integrate prior knowledge into the data mining process to improve the quality of mining results.

SUMMARY

To solve the above technical problems, the present application provides an autonomous mining method of industrial big data based on model sets, which realizes the automation of big data mining process, the automatic integration of prior knowledge and the optimization of mining results through the deep integration of knowledge and mining process based on model sets instead of a single model. Moreover, the open structure of model sets can not only ensure the automatic expansion of prior knowledge of data, but also realize the integration of mining and modelling.

In order to achieve the above objectives, the present application proposes an autonomous mining method of industrial big data based on model sets, which includes the following steps:

S1, building model sets and a mining engine based on domain knowledge and structural characteristics of multi-source heterogeneous data;

S2, carrying out data sampling on the multi-source heterogeneous data, and counting the fault-tolerant estimation of random error variance;

S3, mining data sets by using the mining engine, and determining the optimal fault-tolerant model of each sampled data sequence and the optimal fault-tolerant estimation of model parameters;

S4, performing goodness-of-fit statistics calculation and VV&A test by using the optimal fault-tolerant model; and S5, acquiring data model representation and connotation knowledge based on model sets.

Optionally, the model sets include time series analysis model class, regression analysis model class, time-varying curve fitting model class and batch process model class with fault data.

Optionally, the mining engine adopts a fault-tolerant mining engine.

Optionally, a construction method of the fault-tolerant mining engine is as follows:

selecting and combine one of four model classes with the data set in a data cluster to build a least square mining engine; and taking a heavily attenuated integral function as a loss function instead of a least square integral function in the least square mining engine to obtain a fault-tolerant mining engine.

Optionally, the VV&A test includes: checking the optimal fault-tolerant model mined to confirm rationality of the model sets used in a mining process; then, investigating consistency between expressed knowledge and data of the optimal fault-tolerant model, and testing the goodness of fit of associated data set; finally, the process of knowledge validation of the mining model: identifying the mining models and knowledge through model validation.

Optionally, the time series analysis model class includes autoregressive model, moving average model, autoregressive moving average model, periodic autoregressive moving average model and controlled autoregressive model.

Optionally, the regression analysis model class includes linear regression model, nonlinear regression model and Logistic model.

Optionally, the time-varying curve fitting model class includes polynomial fitting model, triangular polynomial fitting model and periodic progressive model.

Optionally, the S2 includes:
automatically extracting the time series data sequence from the multi-source heterogeneous data;
taking a time series data change process as a superposition of three modes: subject change component, random disturbance component and abnormal change component by adopting a multi-modal additive hypothesis; and
eliminating influence of abnormal change component by using the fault-tolerant fitting method of subject component curve to obtain the fault-tolerant estimation of error variance of the random disturbance component in the sampled data.

Compared with the prior art, the application has the following technical effects.

The application overcomes the technical bottlenecks that the industrial data mining is difficult to automate, integrate knowledge and ensure the optimization of mining results, establishes a group of automatic mining methods of industrial big data based on model sets, integrates domain knowledge into model sets, and realizes automation of mining process of industrial big data, integration of related knowledge, expansion of model sets, integration of mining and modelling and optimization of mining results.

BRIEF DESCRIPTION OF THE DRAWINGS

In order to more clearly explain the embodiments of the present application or the technical solutions in the prior art, the following will briefly introduce the drawings that need to be used in the embodiments. Obviously, the drawings in the following description are only some embodiments of the present application. For those of ordinary skill in the art, other drawings can be obtained according to these drawings without any creative labour.

DETAILED DESCRIPTION OF THE EMBODIMENTS

In order to more clearly explain the embodiments of the present application or the technical solutions in the prior art, the following will briefly introduce the drawings that need to be used in the embodiments. Obviously, the drawings in the following description are only some embodiments of the present application. For those of ordinary skill in the art, other drawings can be obtained according to these drawings without any creative labour.

In order to make the above objectives, characteristics and advantages of the present application more obvious and understandable, the present application will be explained in further detail below with reference to the drawings and detailed description.

Embodiment 1

Figure 2:
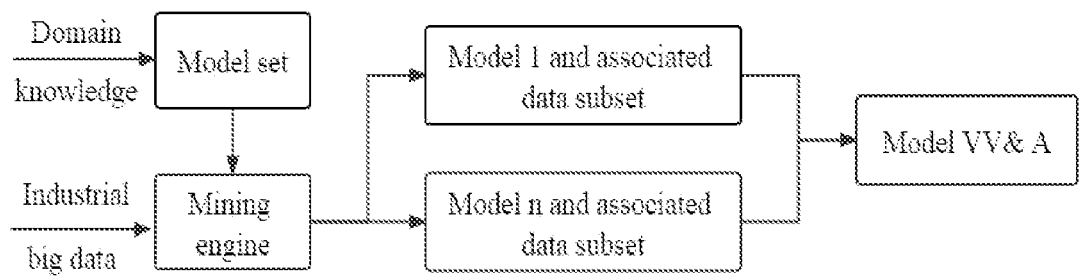
FIG. 2 is a brief process diagram of the method of the embodiment of the present application.

Based on the autonomous mining method of industrial big data based on model sets and on the basis of understanding the basic composition, structure and basic characteristics of industrial big data, the application builds model sets and a mining engine combining with domain knowledge, and adopts the mining engine to drive the mining process to realize autonomous mining and modelling of big data, as shown in FIG. 2.

Figure 1:
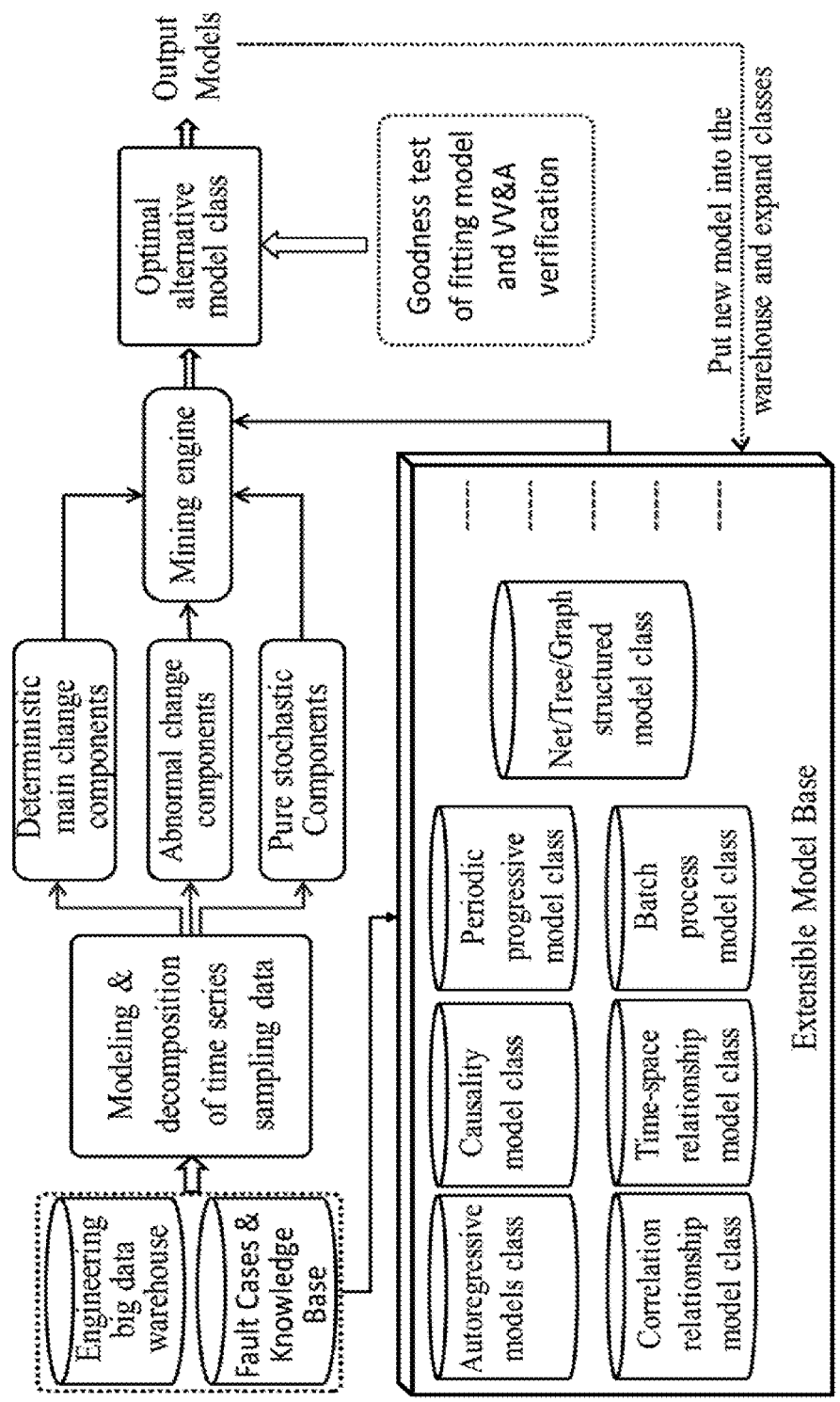
FIG. 1 is a method flow chart of an embodiment of the present application.

Specifically, multi-source heterogeneous big data is mined and model based on model sets, based on problem-driven and domain knowledge, and combined with data structure analysis and characteristic analysis, a model set and an extensible model base based on domain knowledge are constructed, and a mining engine with strong fault-tolerant ability to minimize fitting residuals for outliers and blobs is designed to automate the mining process and optimize the mining results based on existing knowledge, as shown in FIG. 1.

Figure 4:
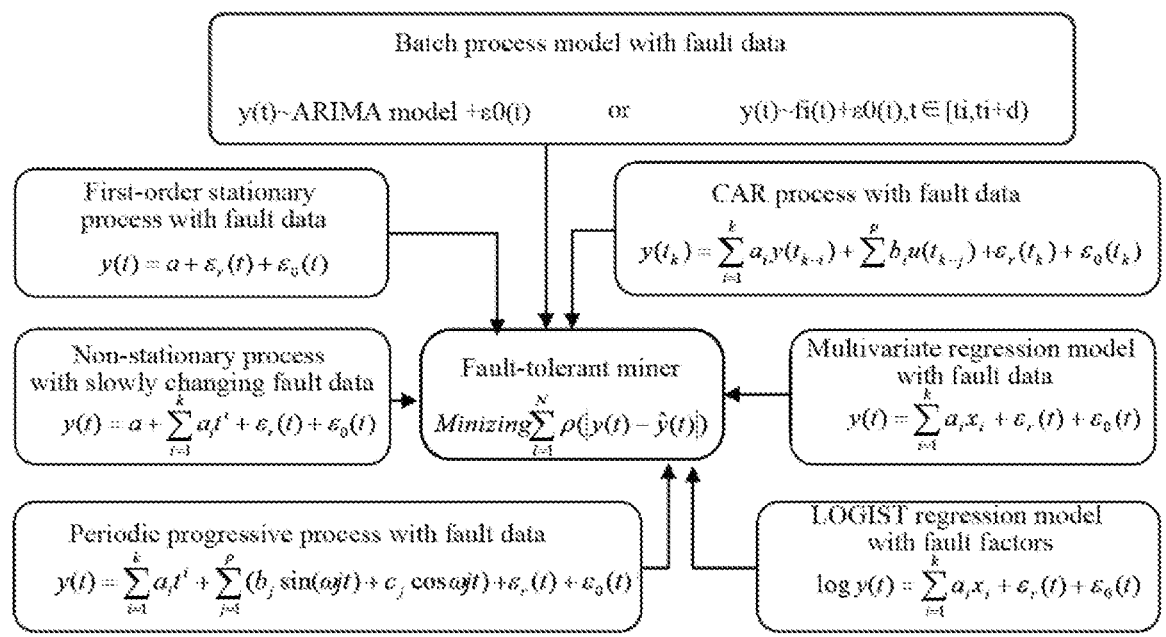
FIG. 4 is a mining and modelling diagram of telemetry parameters based on typical model sets according to the embodiment of the present application.

The application proposes an autonomous mining method of industrial big data based on model set, which includes the following steps:

S1, building model sets and a mining engine based on domain knowledge and structural characteristics of multi-source heterogeneous data;

S1.1, building model sets on the basis of understanding the data structure characteristics and domain knowledge. Example: for the multi-source structured data adopted by sensor network in industrial production process, a model set which is composed of four categories of models and conforms to the data structure is constructed. As shown in Table 1 and FIG. 4, the model set includes: time series analysis model class, regression analysis model class, time-varying curve fitting model class and batch process model class with fault data.

Time series analysis model class includes: autoregressive model, moving average model, autoregressive moving average model, periodic autoregressive moving average model, controlled autoregressive model, etc. Regression analysis model class includes linear regression model, nonlinear regression model and Logistic model. Time-varying curve fitting model class includes polynomial fitting model, triangular polynomial fitting model, periodic progressive model, etc.

S1.2, designing the mining engine. Considering that the actual sampled data usually contains a few outliers, the fault-tolerant mining engine is selected, and the construction method is as follows:

(1) Least squared mining engine

The model set refers to the set of model classes. The adopted model set is denoted as M, and the cluster formed by multi-channel sampled data sequence in industrial process is denoted as S. Take the model class $\{F(\theta|x)\} \in M$ in the model set M and the data set $\{\overline{y}\}=\{(x_i,y_i):j=1,\ldots,n\} \in S$ in the data cluster to construct the Least squared (LS-) mining engine:

$$\{\hat{F}, \hat{\theta}\} = \arg \min_{F(\theta|x) \in M} izing \min_{\theta \in \Omega} izing\left\{\sum_{-1}^{n}(y_j - F(\theta|x_i))^2\right\}, \quad (1)$$

so the optimal model $\hat{F}(\hat{\theta})$ related to $\{\overline{y}\}=\{(x_i,y_i):j=1,\ldots,n\} \in S$ in model set M is mined.

The set of all the mined models mentioned above is a subset of the model set M, that is $\{\hat{F}(\hat{\theta})\} \subset M$, then the set of knowledge of the data cluster S is constituted acquired through mining. The knowledge reduction of data cluster S can be realized by performing model clustering on $\{\hat{F}(\hat{\theta})\} \subset M$.

(2) Fault-tolerant least square mining engine

Figures 3A, 3B:
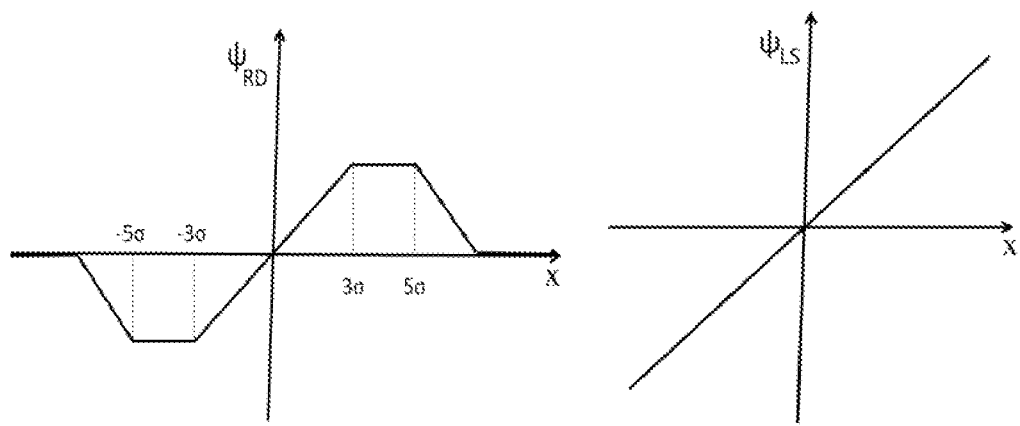
FIGS. 3A and 3B are functional diagrams of an embodiment of the present application; wherein, (a) is a heavily attenuated $\psi_{RD}$-function graph; (b) is the least square $\psi_{LS}$-function graph.

Considering that Outliers are inevitable in the sampled data of industrial production process, in order to overcome the adverse effects of outliers on data mining, a Re-descending (RD-) type $\psi_{RD}$-function as shown in FIG. 3(a) is constructed:

Selecting the integral function of the heavily attenuated $\psi_{RD}$-function shown in FIG. 3(a) and $\rho_{RD}(x) = \int \psi_{RD}(x) dx$ as the loss function instead of the integral function of the least square $\psi_{LS}$-function shown in FIG. 3 (b), and substitute the loss function into the formula (1) to obtain the mining engine with fault tolerance:

$$\{\hat{F}_{RD}, \hat{\theta}_{RD}\} = \arg \min_{F(\theta|x) \in M} izing \min_{\theta \in \Omega} izing\left\{\sum_{i=1}^{n} \rho_{RD}(y_j - F(\theta|x_i))\right\}, \quad (2)$$

Compared with the least square mining engine, the fault-tolerant mining engine can treat different quality measurement data differently: when the measurement data is in the normal range, the information brought is fully utilized; when the measured data slightly exceeds the normal range, the information brought is compressed and utilized in a limited way; when the measured data is seriously out of the normal range, the information brought is gradually reduced until the information is eliminated.

S2, automatically extracting the time series data from the engineering data warehouse, and taking a time series data change process as a superposition of three modes: subject change component, random disturbance component and abnormal change component by adopting a multi-modal additive hypothesis; eliminating influence of abnormal change component by using the fault-tolerant fitting method of subject component curve to obtain the fault-tolerant estimation of error variance of the random disturbance component in the sampled data.

S3, mining the data set by using the fault-tolerant mining engine, selecting $\phi$-function as shown in FIG. 3(a), and determining the optimal fault-tolerant model and the optimal fault-tolerant estimation of model parameters of each sampled data sequence according to formula (2).

S4, statistical calculation of model goodness of fit and VV&A test.

VV&A (Verification, validation & accreditation) of mining model is to check, verify and confirm the mined model. Verification is to confirm the rationality of the model set used in the mining process, and verification is the feedback confirmation of prior knowledge and model base call; validation is to examine the consistency between the knowledge and data expressed by the model, and to test the goodness of fit of the associated data sets in combination with the model, in which R 2-statistics is used to test the goodness of fit of the mining model; accreditation is the process of knowledge confirmation of mining models based on verification and validation. Through model confirmation, the mined models and knowledge can be recognized.

S5, clustering the model according to the structure, realizing data clustering according to the model based on the model clustering, and acquiring data model representation and connotation knowledge.

TABLE 1

| NO. | Model class | Model Name | Canonical form |
|---|---|---|---|
| 1 | Time series analysis model class | Autoregressive model AR | $y(t_k) = \sum_{i=1}^{p} a_i y(t_{k-i}) + \varepsilon(t_k)$ |
| | | Moving average model MA | $y(t_k) = \varepsilon(t_k) + \sum_{i=1}^{q} b_i \varepsilon(t_{k-i})$ |
| | | Autoregressive moving average model ARMA | $y(t_k) = \sum_{i=1}^{p} a_i y(t_{k-i}) + \sum_{j=0}^{q} \varepsilon(t_{k-j})$ |
| | | Periodic autoregressive moving average model ARIMA | $\left(1 - \sum_{i=1}^{p} a_i L^i\right)(1-L)^d y(t_k) = \left(1 + \sum_{i=1}^{q} b_i L^i\right)\varepsilon(t_k)$<br>L is Lag operator, $d \in Z$ |
| | | Control autogressive model CAR | $y(t_k) = \sum_{i=1}^{k} a_i y(t_{k-i}) + \sum_{j=1}^{p} b_j u(t_{k-j}) + \varepsilon(t_k)$ |
| 2 | Regression analysis model class | Linear regression model | $y(t_k) = a_0 + \sum_{i=1}^{q} a_i x_i(t_k) + \varepsilon(t_k)$ |
| | | Nonlinear regression model | $y(t) = f(x_1(t), \ldots, x_p(t); \theta + \varepsilon(t)$<br>(F is a nonlinear function and $\theta$ is a parameter to be estimated.) |
| | | Logistic model | $\log y(t_k) = \sum_{i=1}^{q} a_i x_i(t_k) + \varepsilon(t_k)$ |

TABLE 1-continued

| NO. | Model class | Model Name | Canonical form |
|---|---|---|---|
| 3 | Time-varying curve fitting model class | Polynomial fitting model | $y(t) = a_0 + \sum_{i=1}^{q} a_i t^i + \varepsilon(t)$ |
| | | Triangular polynomial fitting model | $y(t) = a_0 + \sum_{i=1}^{q} [a_i \sin(\omega it) + b_i \cos(\omega it)] + \varepsilon(t)$ |
| | | Periodic progressive model | $y(t) = \sum_{i=0}^{m} a_i t^i + \sum_{i=1}^{q} [a_i \sin(\omega it) + b_i \cos(\omega it)] + \varepsilon(t)$ |

The application constructs a big data autonomous mining and modeling platform based on the big data mining method based on knowledge and data fusion of model sets, solves the technical problems of cluster analysis, autonomous modeling, statistical learning and knowledge discovery of industrial big data, and has been successfully applied to different fields such as spacecraft operation management, intelligent operation and maintenance of industrial robots, etc., with remarkable benefits.

The above-mentioned embodiments only describe the preferred mode of the application, but do not limit the scope of the application. On the premise of not departing from the design spirit of the application, all kinds of modifications and improvements made by ordinary technicians in the field to the technical scheme of the application shall fall within the scope of protection determined by the claims of the application.

What is claimed is:

1. An autonomous mining method of industrial big data based on model sets, comprising following steps:

Step 1, constructing model sets comprises: time series analysis model class, regression analysis model class, time-varying curve fitting model class and batch process model class with fault data, wherein the model sets construct by a data structure analysis and a characteristic analysis based on domain knowledge; constructing a mining engine comprises: structural characteristics of multi-source heterogeneous data which construct by a modal decomposition of time series data sequence automatically extracted from an engineering data warehouse; constructing a fault-tolerant mining engine comprises: selecting and combine one of four model classes of the model sets with the data set in a data cluster to build a least square mining engine; and taking a heavily attenuated integral function as a loss function instead of a least square integral function in the least square mining engine to obtain a fault-tolerant mining engine;

Step 2, carrying out data sampling from the multi-source heterogeneous data by using the mining engine, and counting the fault-tolerant estimation of random error variance of sampled data wherein the sampled data is a time series data sequence automatically extracted from an engineering data warehouse;

Step 3, mining a data set by using the mining engine comprises: extracting the time series data sequence automatically from the multi-source heterogeneous data and taking a time series data change process as a superposition of three modes: subject change component, random disturbance component and abnormal change component by adopting a multi-modal additive hypothesis; adopting a fault-tolerant fitting method of a subject component curve to eliminate influence of outlier abnormal change component and realize a fault-tolerant estimation of error variance of the random disturbance component in the sampled data; substituting a φ-function into the fault-tolerant mining engine to determine an optimal fault-tolerant model of each sampled data sequence and an optimal fault-tolerant estimation of model parameters;

Step 4, performing a goodness of fit statistics calculation and a VV&A (Verification, validation & accreditation) test by using the optimal fault-tolerant model for checking the optimal fault tolerant model mined to confirm rationality; and Step 5, clustering the model sets and clustering the data set to obtain the mining engine with fault-tolerant.

2. The autonomous mining method of industrial big data based on model sets according to claim 1, wherein the VV&A test comprises: checking the optimal fault-tolerant model mined to confirm rationality of the model sets used in a mining process; then, investigating consistency between expressed knowledge and data of the optimal fault-tolerant model, and testing the goodness of fit of associated data set; finally, the process of knowledge validation of the mining model: identifying the mining models and knowledge through model validation.

3. The autonomous mining method of industrial big data based on model sets according to claim 1, wherein the time series analysis model class comprises autoregressive model, moving average model, autoregressive moving average model, periodic autoregressive moving average model and controlled autoregressive model.

4. The autonomous mining method of industrial big data based on model sets according to claim 1, wherein the regression analysis model class comprises linear regression model, nonlinear regression model and Logistic model.

5. The autonomous mining method of industrial big data based on model sets according to claim 1, wherein the time-varying curve fitting model class comprises polynomial fitting model, triangular polynomial fitting model and periodic progressive model.

* * * * *